United States Patent
Mizukami et al.

(10) Patent No.: US 12,018,704 B2
(45) Date of Patent: Jun. 25, 2024

(54) SHELL MEMBER FOR ACCUMULATOR, METHOD OF PRODUCING THE SAME, ACCUMULATOR, AND METHOD OF PRODUCING THE SAME

(71) Applicant: NHK SPRING CO., LTD., Yokohama (JP)

(72) Inventors: Hiroshi Mizukami, Yokohama (JP); Naohito Nakano, Yokohama (JP); Mieko Yanagida, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/982,250

(22) PCT Filed: Mar. 27, 2019

(86) PCT No.: PCT/JP2019/013222
§ 371 (c)(1),
(2) Date: Sep. 18, 2020

(87) PCT Pub. No.: WO2019/189375
PCT Pub. Date: Oct. 3, 2019

(65) Prior Publication Data
US 2021/0048042 A1 Feb. 18, 2021

(30) Foreign Application Priority Data
Mar. 29, 2018 (JP) .................. 2018-063932

(51) Int. Cl.
*F15B 1/04* (2006.01)
*B21D 22/20* (2006.01)
(Continued)

(52) U.S. Cl.
CPC ............. *F15B 1/04* (2013.01); *B21D 22/20* (2013.01); *B21D 51/24* (2013.01); *B23K 26/21* (2015.10);
(Continued)

(58) Field of Classification Search
CPC ...... B21D 35/006; B21D 51/04; B21D 51/10; B21D 51/18; B21D 51/24; B23K 11/093;
(Continued)

(56) References Cited

U.S. PATENT DOCUMENTS 1,200,309 A * 10/1916 Carlson ................. B21D 22/28
220/DIG. 22
1,987,718 A * 1/1935 Smith .................... B21D 51/24
72/340
(Continued)

FOREIGN PATENT DOCUMENTS

DE 3901261 A1 7/1990
GB 2028924 A 3/1980
(Continued)

OTHER PUBLICATIONS

Office Action issued in Japanese Appln. No. 2018-063932 mailed Apr. 27, 2021. English machine translation provided.
(Continued)

*Primary Examiner* — Robert K Arundale
*Assistant Examiner* — Richard K. Durden
(74) *Attorney, Agent, or Firm* — ROSSI, KIMMS & McDOWELL LLP

(57) ABSTRACT

A shell member 10 constituting an accumulator 100 including a cover member 30, a shell member 10 having a cylindrical portion 11, an opening portion 13 formed at one end of the cylindrical portion 11 and welded to the cover member 30, and a closed portion 12 formed at another end of the cylindrical portion 11, and an accumulation part 70
(Continued)

accommodated in the shell member 10. The cylindrical portion 11 includes an upper end portion 11a, and a protruding portion 11c having the opening portion 13. The protruding portion 11c is thicker than the upper end portion 11a.

8 Claims, 6 Drawing Sheets

(51) Int. Cl.
*B21D 51/24* (2006.01)
*B23K 26/21* (2014.01)
*F15B 1/10* (2006.01)
*B21D 35/00* (2006.01)
*B21D 51/16* (2006.01)

(52) U.S. Cl.
CPC .............. *F15B 1/103* (2013.01); *F15B 1/106* (2013.01); *B21D 35/006* (2013.01); *B21D 51/16* (2013.01); *F15B 2201/3153* (2013.01); *F15B 2201/405* (2013.01); *F15B 2201/4056* (2013.01); *F15B 2201/605* (2013.01)

(58) Field of Classification Search
CPC ....... B23K 15/04; B23K 33/006; F15B 1/103; F15B 1/106; F15B 1/22; F15B 2201/3153; F15B 2201/405; F15B 2201/4056; F15B 2201/605; F17C 2201/0123; F17C 2201/0142; F17C 2205/0311; F17C 2209/2181; F17C 2209/234
USPC ........... 29/890.06, DIG. 41; 138/30; 228/184
See application file for complete search history.

(56) References Cited

U.S. PATENT DOCUMENTS

| | | | | |
|---|---|---|---|---|
| 2,026,133 A * | 12/1935 | Mapes | .................... | B21D 51/24 220/DIG. 22 |
| 2,112,653 A * | 3/1938 | Maclennan | ............ | B21D 53/34 72/348 |
| 2,280,501 A * | 4/1942 | Stephenson | ................ | F17C 1/00 220/586 |
| 2,366,617 A * | 1/1945 | Harris | ...................... | F17C 13/06 219/137 R |
| 2,748,464 A * | 6/1956 | Kaul | ........................ | B21K 21/06 220/DIG. 22 |
| 2,776,475 A * | 1/1957 | Mapes | ...................... | F17C 1/00 72/348 |
| 2,875,511 A * | 3/1959 | Hawes | .................. | B21D 22/201 72/348 |
| 3,029,507 A * | 4/1962 | Gaggini | .................. | B21D 51/26 72/260 |
| 3,685,337 A * | 8/1972 | Avitzur | .................. | B21D 22/20 72/347 |
| 4,320,848 A * | 3/1982 | Dye | ........................ | B21D 22/28 220/DIG. 22 |
| 4,541,265 A * | 9/1985 | Dye | ........................ | B21D 22/24 72/347 |
| 5,235,837 A * | 8/1993 | Werner | ................... | B21D 51/24 72/84 |
| 6,505,492 B2 * | 1/2003 | Jroski | .................... | B21D 22/20 72/348 |
| 6,789,576 B2 * | 9/2004 | Umetsu | ................... | F15B 1/103 220/721 |
| 7,520,232 B2 * | 4/2009 | Miyazaki | .................. | B63B 3/54 114/74 A |
| 9,433,995 B2 * | 9/2016 | Chalandon | ............. | B21D 22/21 |
| 9,868,493 B2 * | 1/2018 | Ohtsuka | .................. | B63B 25/16 |
| 10,584,759 B2 | 3/2020 | Baltes | | |
| 2002/0180260 A1 | 12/2002 | Mohr | | |
| 2003/0038532 A1 | 2/2003 | Mohr | | |
| 2006/0037658 A1 * | 2/2006 | Shimbori | ................... | F15B 1/22 138/30 |
| 2014/0224368 A1 * | 8/2014 | Yamashita | .............. | F15B 1/103 138/31 |
| 2016/0068235 A1 * | 3/2016 | Ohtsuka | ................ | F17C 13/002 220/669 |
| 2018/0245656 A1 | 8/2018 | Baltes | | |
| 2020/0158144 A1 * | 5/2020 | Arikawa | ................... | F15B 1/14 |

FOREIGN PATENT DOCUMENTS

| | | |
|---|---|---|
| JP | H0569035 A | 3/1993 |
| JP | 10724583 A | 1/1995 |
| JP | H0824972 A | 1/1996 |
| JP | H10227301 A | 8/1998 |
| JP | 2003120601 A | 4/2003 |
| JP | 2003514202 A | 4/2003 |
| JP | 2007278346 A | 10/2007 |
| JP | 2008291974 A | 12/2008 |
| JP | 2015074000 A | 4/2015 |
| JP | 2018532081 A | 11/2018 |
| WO | 03064862 A1 | 8/2003 |
| WO | 2017045739 A1 | 3/2017 |

OTHER PUBLICATIONS

English translation of Written Opinion issued in Intl. Appln. No. PCT/JP2019/013222 mailed Jun. 25, 2019, previously cited in IDS filed Sep. 18, 2020.

International Preliminary Report on Patentability issued in Intl. Appln. No. PCT/JP2019/013222 mailed Oct. 8, 2020. English translation provided.

Extended European Search Report issued in European Application No. 19774898.1 mailed Apr. 1, 2021.

International Search Report issued in Intl. Appln. No. PCT/JP2019/013222 mailed Jun. 25, 2019. English translation provided.

Written Opinion issued in Intl. Appln. No. PCT/JP2019/013222 mailed Jun. 25, 2019.

Office Action issued in Chinese Appln. No. 201980020298.3 mailed on Dec. 29, 2021. English machine translation provided.

\* cited by examiner

SHELL MEMBER FOR ACCUMULATOR, METHOD OF PRODUCING THE SAME, ACCUMULATOR, AND METHOD OF PRODUCING THE SAME

TECHNICAL FIELD

The present invention relates to a shell member for an accumulator, a method of producing the same, an accumulator, and a method of producing the same.

BACKGROUND

An accumulator includes a cylindrical shell member which accommodates a bellows. The interior of the accumulator is divided by the bellows into a gas chamber and an oil chamber. Due to expansion of gas in the gas chamber in response to expansion and contraction of the bellows, fluctuations in pressure of oil flowing into the oil chamber are buffered. With such a pressure fluctuation buffering effect, the accumulator is connected to, for example, a hydraulic circuit of an automobile.

One of techniques relating to the accumulator is disclosed in Patent Document 1. Patent Document 1 discloses an accumulator including a shell member (shell 20 described in Patent Document 1) having a cylindrical portion, an opening portion formed at one end of the cylindrical portion, and a closed portion formed at the other end of the cylindrical portion, and a cover member (shell 30 described in Patent Document 1) welded to the shell member.

CITATION LIST

Patent Literature

Patent Document 1: JP2003-120601A (especially, see FIG. 1 and paragraph 0021)

SUMMARY

Problems to be Solved

In the accumulator disclosed in Patent Document 1, while the body protrudes outward in the vicinity of a weld between the shell member and the cover member, the shell member has a uniform thickness. Accordingly, the thickness of the shell member at the weld is the same as the other portions of the shell member. However, due to high pressure inside the accumulator, the stress concentrates on the weld which is brittle compared to the other portions. Therefore, the welded portion is likely to break, so that there is a problem in durability of the accumulator.

On the other hand, in the accumulator disclosed in Patent Document 1, if the thickness of the weld is increased to improve the durability, the thickness of the entire shell member is increased. As a result, the weight of the accumulator is increased, so that the weight of a vehicle equipped with the accumulator is increased. This causes a reduction in fuel efficiency of the vehicle.

An object of at least one embodiment of the present invention is to provide a shell member for an accumulator, a method of producing the same, an accumulator, and a method of producing the same whereby it is possible to reduce the weight while improving the durability.

Solution to the Problems (1) A shell member for an accumulator according to at least some embodiments of the present invention is a shell member constituting an accumulator comprising: a cover member; a shell member having a cylindrical portion, an opening portion formed at one end of the cylindrical portion and welded to the cover member, and a closed portion formed at another end of the cylindrical portion; and an accumulation part accommodated in the shell member, in which the cylindrical portion includes a first wall portion, and a second wall portion having the opening portion, and the second wall portion is thicker than the first wall portion.

With the above configuration (1), when the accumulator is obtained by welding to the cover member, the thickness of the weld can be increased. Thus, even when stress concentrates on the weld during the use of the accumulator, it is possible to suppress breakage starting from the weld and improve the durability of the accumulator. Further, since the portion (including first wall portion) other than the second wall portion is thinner than the second wall portion, it is possible to reduce the weight of the accumulator.

(2) In some embodiments, in the above (1), the second wall portion is formed so as to protrude outward from the first wall portion.

With the above configuration (2), it is possible to ensure the inner volume of the shell member, and sufficiently achieve the pressure fluctuation buffering effect by the accumulator. Further, since an inward protrusion is suppressed, it is possible to reduce the stress concentration and improve the durability of the accumulator.

(3) In some embodiments, in the above (1) or (2), the cylindrical portion includes a taper portion disposed between the first wall portion and the second wall portion and connecting an outer surface of the first wall portion to an outer surface of the second wall portion.

With the above configuration (3), when the shell member is produced, it is easy to remove the shell member from a mold. Further, with the taper portion, the thickness of the cylindrical portion can be gradually changed. Thus, while ensuring a sufficient thickness of the opening portion to be welded, the thickness of the other portions can be decreased to reduce the weight of the shell member.

(4) A method of producing a shell member for an accumulator according to at least some embodiments of the present invention is to produce the shell member described in any one of the above (1) to (3), comprising a molding step of press-molding a metal disk whose thickness is greater in a peripheral portion than in a center portion into a cylindrical shape.

With the above method (4), the shell member can be produced by press-molding using a metal disk. Accordingly, it is possible to significantly simplify the production process, as compared with production by casting or the like. Further, it is possible to simplify the production facility, as compared with a casting facility or the like.

(5) An accumulator according to at least some embodiments of the present invention is an accumulator including the shell member described in any one of the above (1) to (3), comprising a weld at a joint between the opening portion of the shell member and the cover member.

With the above method (5), even when stress concentrates on the weld during the use of the accumulator, it is possible to suppress breakage starting from the weld and improve the durability of the accumulator. Further, since the portion other than the second wall portion is thin, it is possible to reduce the weight of the accumulator.

(6) A method of producing an accumulator according to at least some embodiments of the present invention comprises a welding step of welding the opening portion of the shell member and the cover member.

With the above method (6), the shell member and the cover member can be joined by welding without using a separate joint member.

Advantageous Effects

At least one embodiment of the present invention provides a shell member for an accumulator, a method of producing the same, an accumulator, and a method of producing the same whereby it is possible to reduce the weight while improving the durability.

DETAILED DESCRIPTION

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
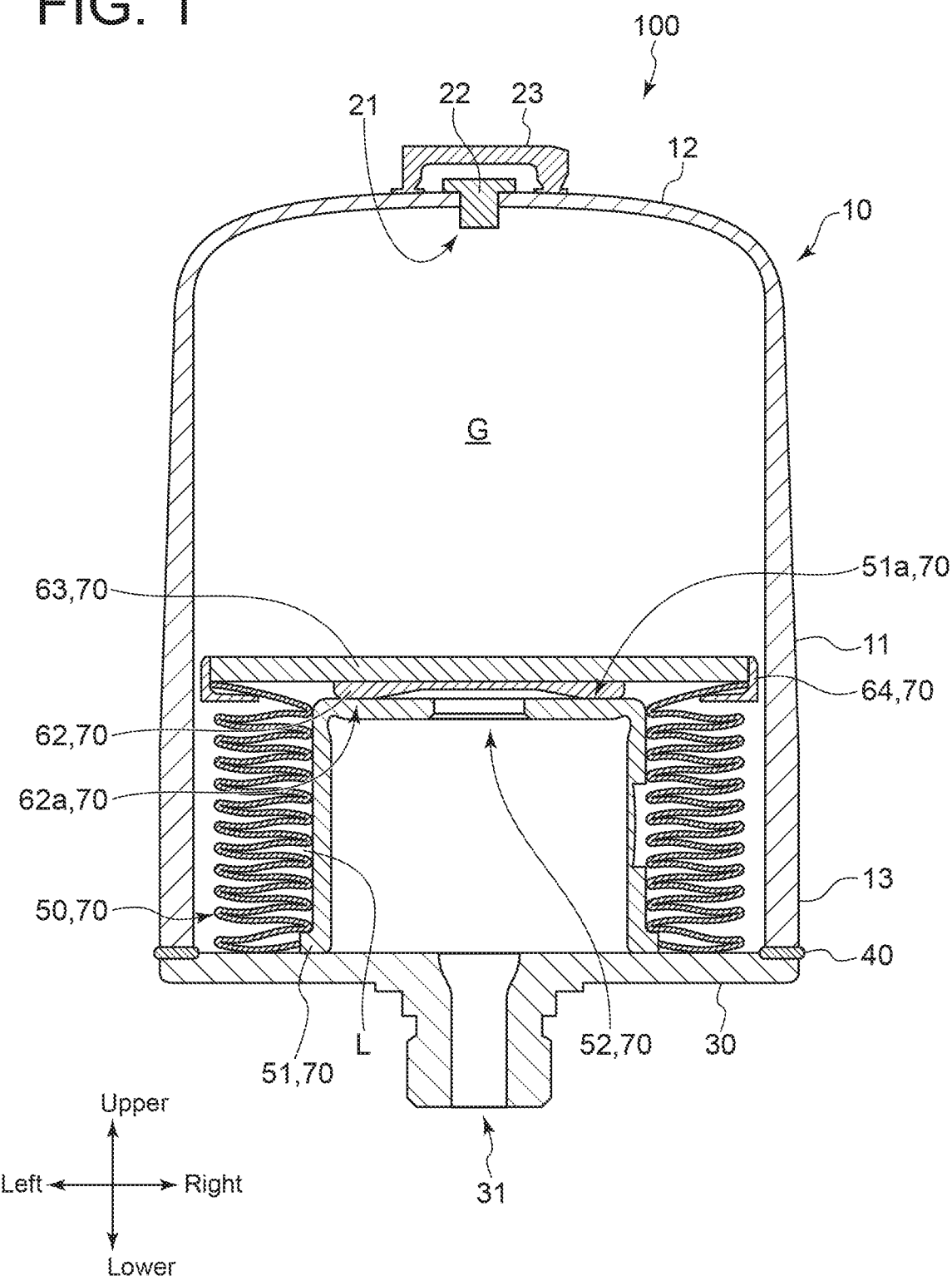
FIG. 1 is a cross-sectional view of an accumulator according to an embodiment of the present invention.

FIG. 1 is a cross-sectional view of an accumulator 100 according to an embodiment of the present invention. The accumulator 100 includes a shell member 10, a cover member 30, and accumulation parts 70 accommodated in the shell member 10. Inside the accumulator 100, a gas chamber G is formed above a bellows 50 of the accumulation parts 70. On the other hand, a liquid chamber L is formed below the bellows 50.

The shell member 10 has a cylindrical portion 11, an opening portion 13 formed at one end (lower end) of the cylindrical portion 11, and a closed portion 12 formed at the other end (upper end) of the cylindrical portion 11. The shell member 10 is welded to the cover member 30. Accordingly, the opening portion 13 of the shell member 10 is sealed (closed) by the cover member 30. At the welded portion between the opening portion 13 of the shell member 10 and the cover member 30, a weld 40 is formed.

The closed portion 12 has a gas inlet 21, and the gas inlet 21 is sealed by a plug 22. The plug 22 is welded to the closed portion 12. A head 23 is disposed above the plug 22, and the head 23 is also welded to the closed portion 12.

The cover member 30 has a circular shape in a top view and is referred to as an "end plate". The cover member 30 has a port 31 through which the inside and the outside of the accumulator 100 are communicated. The port 31 is connected to a hydraulic circuit (not shown), and oil from the hydraulic circuit enters the accumulator 100 through the port 31 to buffer pressure fluctuations in the hydraulic circuit.

The outer diameter of the cover member 30 is equal to the outer diameter of the opening portion 13 of the cylindrical portion 11. However, as described later in detail with reference to FIG. 2, the shell member 10 is shaped so as to gradually enlarge downward. Accordingly, the outer diameter of the cover member 30 is greater than the outer diameter of the closed portion 12 formed at the upper end of the cylindrical portion 11.

The accumulation parts 70 are accommodated in the shell member 10 as described above, and interact with each other to provide the pressure fluctuation buffering effect. The accumulation parts 70 include a bellows 50 composed of, for example, a formed bellows, a cylindrical member 51, a communication hole 52, a self seal 62, a seal function member 63, and a guide 64.

Among them, the self seal 62 is fixed to the lower surface of the seal function member 63. The guide 64 for guiding the vertical movement of the seal function member 63 is fixed to the edge of the seal function member 63. Further, the upper end of the bellows 50 is fixed between the lower surface of the seal function member 63 and the upper surface of the guide 64. Thus, the self seal 62, the seal function member 63, and the guide 64 are integrated with the bellows 50.

When the bellows 50 contracts, the lower end 62a of the self seal 62 is in contact with the upper end surface 51a of the cylindrical member 51. In this state, oil in the hydraulic circuit (not shown) enters the interior of the cylindrical member 51 through the port 31, and when the pressure of the liquid chamber L exceeds the pressure of the gas chamber G, the bellows 50 starts to expand upward. Thus, the seal function member 63 and the other parts integrally formed with the bellows 50 are moved upward by the guide 64. As a result, gas in the gas chamber G is compressed.

On the other hand, when the pressure of the liquid chamber L decreases and falls below the pressure of the gas chamber G, the bellows contracts downward. Eventually, the seal function member 63 and the other parts return to the position where the lower end 62a of the self seal 62 is in contact with the upper end surface 51a of the cylindrical member 51. As a result, gas in the gas chamber G is expanded and returns to the state before compression.

Due to such compression and expansion of gas in the gas chamber G, pressure fluctuations in oil flowing through the hydraulic circuit are buffered. As a result, the pulsation of the hydraulic circuit is reduced.

Figure 2:
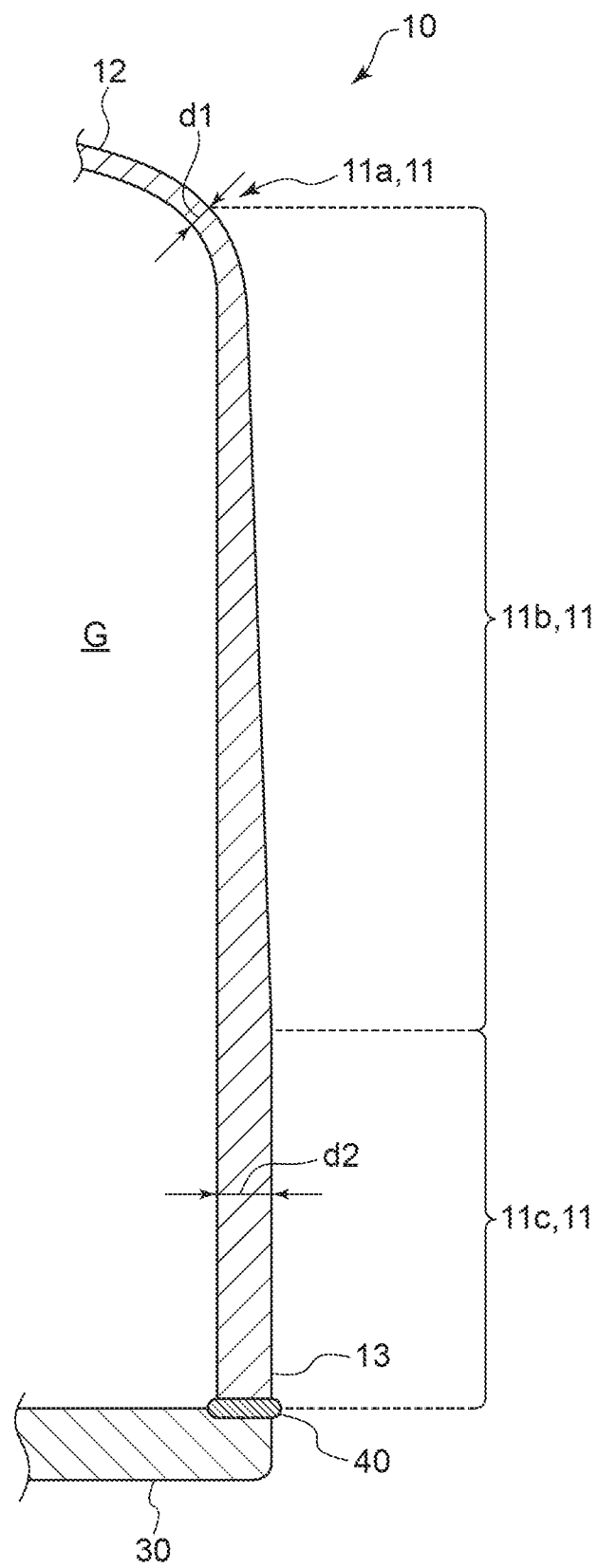
FIG. 2 is a cross-sectional view of a shell member according to an embodiment of the present invention.

FIG. 2 is a cross-sectional view of the shell member 10 according to an embodiment of the present invention. In FIG. 2, the accumulation parts 70 accommodated in the shell member 10 are not depicted. The cylindrical portion 11 of the shell member 10 includes an upper end portion 11a (first wall portion) and a protruding portion 11c (second wall portion) formed so as to protrude outward from the upper end portion 11a. Accordingly, the cylindrical portion 11 is formed so as to protrude outward toward the lower side. That is, while the inner surface of the cylindrical portion 11 is formed by a uniform surface in the vertical direction, the outer surface thereof protrudes outward toward the lower side.

In this way, since the protruding portion 11c is formed so as to protrude outward from the upper end portion 11a, it is possible to ensure the inner volume of the shell member 10, and sufficiently achieve the pressure fluctuation buffering effect by the accumulator 100. Further, since an inward protrusion is suppressed, it is possible to reduce the stress concentration and improve the durability of the accumulator.

A relationship between the thickness d1 of the upper end portion 11a and the thickness d2 of the protruding portion 11c of the shell member 10 satisfies d2>d1 (i.e., protruding portion 11c is thicker than upper end portion 11a). The thickness d2 of the protruding portion 11c is preferably 1.03 times or more, more preferably 1.05 times or more, particularly preferably 1.07 times or more the thickness d1 of the upper end portion 11a. The upper limit of the thickness d2 of the protruding portion 11c is preferably, but is not particularly limited to, 1.2 times or less, more preferably 1.15 times or less, particularly preferably 1.12 times or less the thickness d1 of the upper end portion 11a. The thickness of the protruding portion 11c is preferably constant over the entire area of the protruding portion 11c in the vertical direction.

As described above, in the shell member 10, the protruding portion 11c is thicker than the upper end portion 11a. Since the protruding portion 11c is thicker than the upper end portion 11a, the thickness of the weld 40 can be increased. Thus, even when stress concentrates on the weld 40 during the use of the accumulator 100, it is possible to suppress breakage starting from the weld 40, and improve the durability of the accumulator 100. Further, since the portion (including upper end portion 11a, and taper portion 11b described later) other than the protruding portion 11c is thinner than the protruding portion 11c, it is possible to reduce the weight of the accumulator 100.

The cylindrical portion 11 includes, in addition to the upper end portion 11a and the protruding portion 11c, a taper portion 11b disposed therebetween and connecting the outer surface of the upper end portion 11a to the outer surface of the protruding portion 11c. With the taper portion 11b, when the shell member 10 is produced by, for instance, press-molding, it is easy to remove the shell member 10 from a die (not shown). Further, with the taper portion 11b, the thickness of the cylindrical portion 11 can be gradually changed. Thus, while ensuring a sufficient thickness of the weld 14 (corresponding to opening portion 13 (see FIG. 5) to be welded), the thickness of the other portions can be decreased to reduce the weight of the shell member 10.

Figure 8:
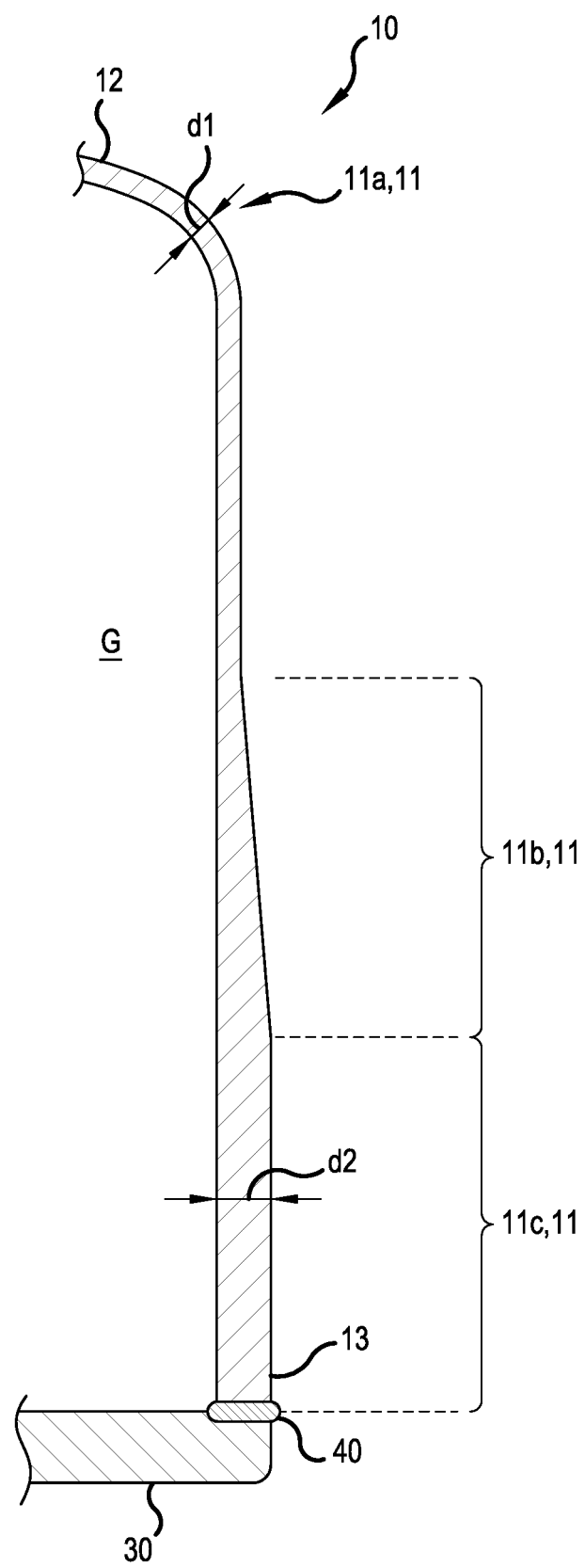
FIG. 8 is a cross-sectional view of a shell member according to another embodiment of the present invention.

Although in the above example, the cylindrical portion 11 has the taper portion 11b formed between the upper end portion 11a and the protruding portion 11c, a step which is rectangular in the cross-sectional view shown in FIG. 1 may be formed without forming the taper portion 11b. Further, in the case of forming the taper portion 11b, the position of the taper is not limited to the example of FIG. 2. For instance, a region from the upper end to a substantially central portion in the height direction of the cylindrical portion 11 may have the same thickness (corresponding to upper end portion 11a; first wall portion), and the taper may be formed so as to extend from the substantially central portion in the height direction to the protruding portion 11c, as shown in FIG. 8.

Figure 3:
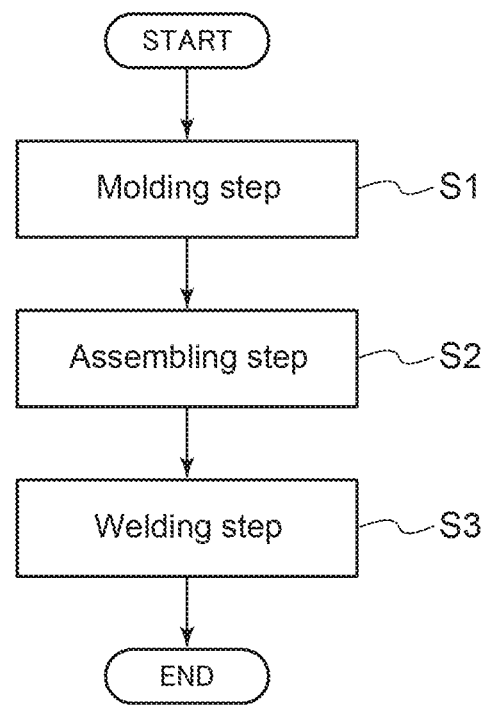
FIG. 3 is a flowchart of a method of producing an accumulator according to an embodiment of the present invention.

FIG. 3 is a flowchart of a method of producing the accumulator 100 according to an embodiment of the present invention (hereinafter, also simply referred to as "production method according to an embodiment"). The production method according to an embodiment includes a molding step S1, an assembling step S2, and a welding step S3. Among these steps, the shell member 10 is produced by the molding step S1. Then, by the assembling step S2 and the welding step S3, the accumulator 100 is produced using the shell member 10 produced by the molding step S1. Each step may be performed multiple times. Specifically, for instance, the molding step S1 may be repeated multiple times to form the shell member 10 having a desired shape.

The molding step S1 is a step of press-molding a metal disk whose thickness is greater in a peripheral portion than in a center portion into a cylindrical shape. Through the molding step S1, the shell member 10 is obtained. This point will now be described with reference to FIGS. 4 and 5.

Figure 4:
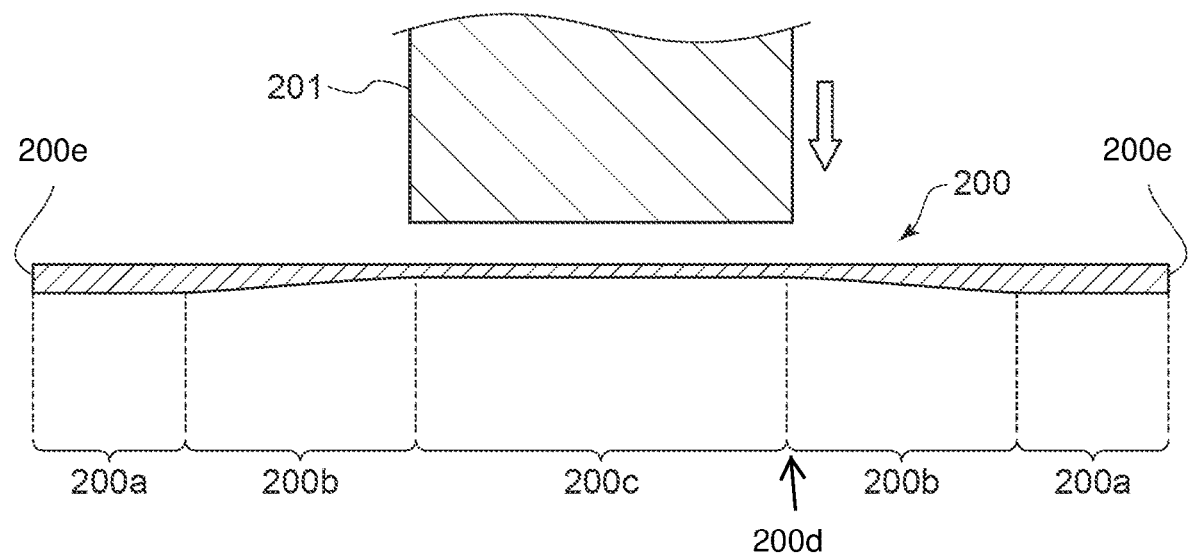
FIG. 4 is a schematic diagram when a shell member according to an embodiment of the present invention is press-molded into a cylindrical shape.

FIG. 4 is a schematic diagram when the shell member 10 according to an embodiment of the present invention is press-molded into a cylindrical shape. The shell member 10 is formed by placing the metal disk 200 on a die (not shown) capable of supporting a peripheral portion 200a, and pressing a central portion 200c of the disk 200 with a punch 201. This pressing process is called "drawing".

The disk 200 has a peripheral portion 200a, a taper portion 200b, and a central portion 200c. The peripheral portion 200a corresponds to the protruding portion 11c (see FIG. 2) after press-molding, the taper portion 200b corresponds to the taper portion 11b (see FIG. 2) after press-molding, and the central portion 200c corresponds to the closed portion (see FIG. 1) after press-molding. Further, a boundary portion 200d between the taper portion 200b and the central portion 200c corresponds to the upper end portion 11a (see FIG. 2) after press-molding. Further, a side surface 200e of the disk 200 corresponds to an opening end surface 13a (see FIG. 6) after press-molding.

In the disk 200, the thickness of the central portion 200c is thinnest, and the thickness of the peripheral portion 200a is thickest. Between the central portion 200c and the peripheral portion 200a, the taper portion 200b connecting them is formed. The thickness of the taper portion 200b gradually increases from the central portion 200c to the peripheral portion 200a. In the disk 200, a surface on the side pressed by the punch 201 is uniform, while the shape of a surface on the opposite side changes outward (radially outward).

The disk 200 can be manufactured, for instance, by punching a metal plate as a material plate into a circular shape and then processing the surface of the circular plate. As the surface processing method, for instance, a thickness increasing process may be performed to form the peripheral portion 200a thicker than the material plate. Additionally, for instance, a rolling process may be performed to form the central portion 200c thinner than the material plate. In particular, as described above, the central portion 200c and the boundary portion 200d correspond to the closed portion 12 and the upper end portion 11a, respectively, to which a small stress is applied during the use of the accumulator. Therefore, by rolling the central portion 200c and the boundary portion 200d to make them thinner than the material plate, it is possible to reduce the weight of the accumulator.

Figure 5:
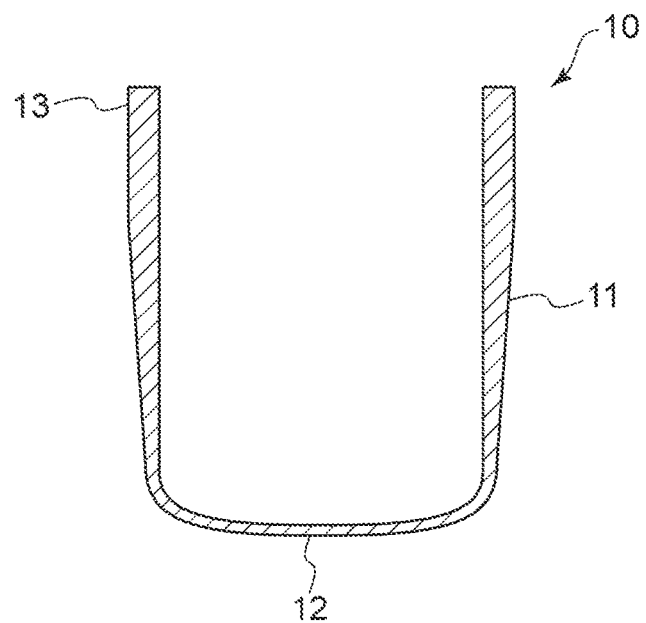
FIG. 5 is a cross-sectional view of the shell member obtained by press-molding shown in FIG. 4.

FIG. 5 is a cross-sectional view of the shell member 10 obtained by press-molding shown in FIG. 4. By pressing with the punch 201 (see FIG. 4), the disk 200 is bent over the entire circumference in the vicinity of the boundary portion 200d. Further, by repeating the pressing with the punch 201 several times as appropriate, the disk 200 is molded into a cylindrical shape, whereby the shell member 10 is obtained. As described above, the shell member 10 includes, in addition to the cylindrical portion 11 and the closed portion 12, the opening portion 13.

By molding the shell member 10 in this way, the shell member 10 can be produced by press-molding using the metal disk 200. Accordingly, it is possible to significantly simplify the production process, as compared with production by casting or the like. Further, it is possible to simplify the production facility, as compared with the casting facility or the like.

Referring to FIG. 3, the assembling step S2 is a step of assembling parts (shell member 10, cover member 30, accumulation part 70, etc.) constituting the accumulator 100. Specifically, in the assembling step S2, after the accumulation part 70 (see FIG. 1) is attached to an upper surface 32 (see FIG. 6) of the cover member 30, the shell member 10 produced in the molding step S1 is placed thereon. Placing the shell member 10 on the accumulation part 70 and placing the cover member 30 thereon will be described with reference to FIG. 6.

Figure 6:
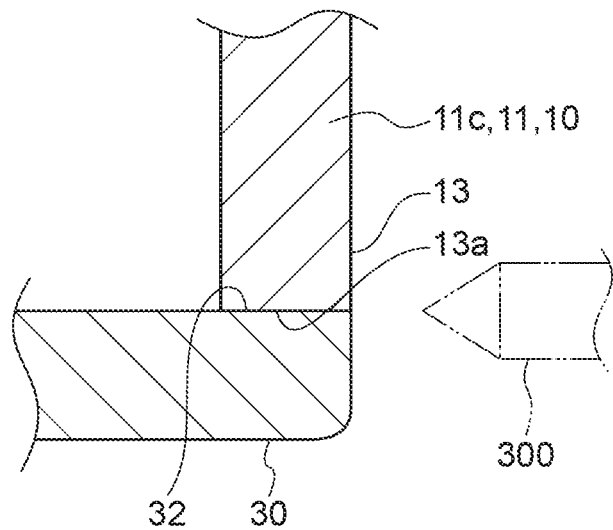
FIG. 6 is a diagram showing the state where an opening portion of a shell member is placed on an upper surface of a cover member.

FIG. 6 is a diagram showing the state where the opening portion 13 of the shell member 10 is placed on the upper surface 32 of the cover member 30. As described above, the outer diameter of the protruding portion 11c having the opening portion 13 is equal to the outer diameter of the cover member 30. Accordingly, when the opening portion 13 of the shell member 10 is placed on the upper surface 32 of the cover member 30, the outer surface of the shell member 10 (outer surface of cylindrical portion 11) and the side surface of the cover member 30 are arranged in the same plane.

Further, when the shell member 10 is placed on the cover member 30, the opening end surface 13a of the shell member 10 faces the upper surface 32 of the cover member 30. In this state, the opening end surface 13a and the upper surface 32 are welded by a welding device 300 shown by the double-dotted dashed line in FIG. 6. This point will be described in detail below.

Referring to FIG. 3 again, the welding step S3 is a step of welding the opening end surface 13a of the shell member 10 and the cover member 30 while the opening end surface 13a of the shell member 10 faces the upper surface 32 of the cover member 30. By welding them, the weld 40 is formed. The welding is performed using the welding device 300 shown by the double-dotted dashed line in FIG. 6, as described above. Illustrative examples of the welding method include electron beam welding and laser beam welding.

Figure 7:
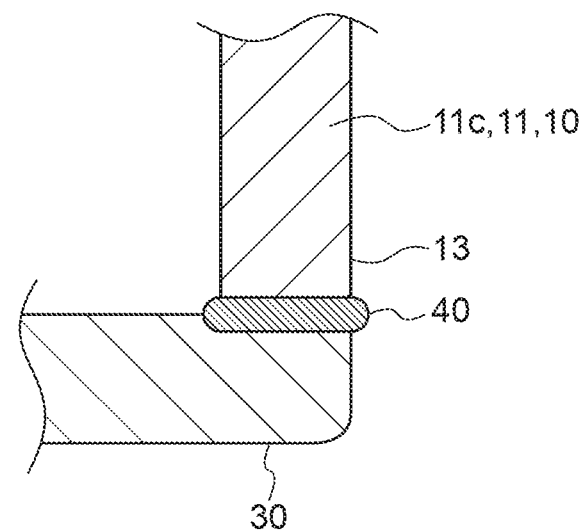
FIG. 7 is a diagram showing the state where a weld is formed at the interface between the shell member and the cover member.

FIG. 7 is a diagram showing the state where the weld 40 is formed at the interface between the shell member 10 and the cover member 30. The weld 40 is formed so as to entirely cover both the opening end surface 13a and the upper surface 32 (see FIG. 6). Thus, the shell member 10 and the cover member 30 can be firmly connected. Further, with such a welding step S3, the shell member 10 and the cover member 30 can be joined by welding without using a separate joint member.

REFERENCE SIGNS LIST

10 Shell member
11 Cylindrical portion
11a Upper end portion
11b Taper portion
11c Protruding portion
12 Closed portion
13 Opening portion
13a Opening end surface
21 Gas inlet
22 Plug
23 Head
30 Cover member
31 Port
32 Upper surface
40 Weld
50 Bellows
51 Cylindrical member
51a Upper end surface
52 Communication hole
62 Self seal
62a Lower end
63 Seal function member
64 Guide
70 Accumulation part
100 Accumulator
200 Disk
200a Peripheral portion
200b Taper portion
200c Central portion
200d Boundary portion
200e Side surface
201 Punch
300 Welding device
G Gas chamber
L Liquid chamber

The invention claimed is:

1. An accumulator, comprising:
a shell member;
a cover member welded to the shell member; and
an accumulation part accommodated in an accommodating space formed by the shell member and the cover member, wherein the shell member comprises:
a cylindrical portion;
an opening portion connected to the cylindrical portion, being formed at one end of the cylindrical portion, and being welded to the cover member; and
a closed portion connected to the cylindrical portion and being formed at another end of the cylindrical portion opposite to the one end of the cylindrical portion at which the opening portion is formed, the closed portion and the cylindrical portion being connected together at a portion of the shell member where the shell member bends radially inward,
wherein the opening portion of the shell member has a first, uniform thickness along a length of the opening portion, the closed portion of the shell member has a second, uniform thickness along a length of the closed portion, and the first thickness of the opening portion is greater than the second thickness of the closed portion, wherein the cylindrical portion of the shell member includes a taper portion having a thickness, the taper portion (i) having the first thickness at a first end of the taper portion connected to the opening portion having the first, uniform thickness and being welded to the cover member, (ii) having the second thickness at a second end of the taper portion connected to the closed portion, and (iii) increasing in thickness from the second thickness to the first thickness along a length of the taper portion, wherein the cylindrical portion including the taper portion has:

an inner surface extending along an axial direction of the cylindrical portion from the first end of the taper portion to the second end of the taper portion so as to radially face the accumulation part; and an outer surface whose diameter decreases from the first end of the taper portion to the second end of the taper portion due to the thickness of the taper portion, corresponding to a radial distance between the inner surface and the outer surface, decreasing from the first thickness to the second thickness, and wherein the second end of the taper portion terminates at the portion of the shell member where the shell member bends radially inward.

2. The accumulator according to claim 1, wherein the opening portion is formed so as to protrude outward from the closed portion.

3. The accumulator according to claim 1, wherein the closed portion connected to the cylindrical portion comprises a sealable opening, and a thickness of the shell member is smallest at a portion of the closed portion adjacent the sealable opening.

4. The accumulator according to claim 3, wherein the thickness of the shell member is largest at the opening portion.

5. The accumulator according to claim 1, wherein the first thickness of the opening portion is in a range of 1.03 times the second thickness of the closed portion to 1.2 times the second thickness of the closed portion.

6. The accumulator according to claim 5, wherein the first thickness of the opening portion is in a range of 1.07 times the second thickness of the closed portion to 1.12 times the second thickness of the closed portion.

7. A method of producing the accumulator according to claim 1, the method comprising:

a molding step of press-molding a metal disk whose thickness is greater in a peripheral portion than in a center portion into a cylindrical shape to obtain the shell member of the accumulator.

8. The method according to claim 7, the method further comprising:

a welding step of welding the opening portion of the shell member and the cover member.

* * * * *